(12) United States Patent
Hobenshield et al.

(10) Patent No.: US 8,172,312 B2
(45) Date of Patent: May 8, 2012

(54) EXCAVATOR CAB WITH AN IMPROVED FIELD OF VIEW

(75) Inventors: Lane C. Hobenshield, Oak Creek, WI (US); Steven Michael Casey, Santa Barbara, CA (US); Mark D. Londborg, Atlanta, GA (US); Russell J. Kroll, Atlanta, GA (US)

(73) Assignee: Caterpillar Global Mining LLC, South Milwaukee, WI (US)

( * ) Notice: Subject to any disclaimer, the term of this patent is extended or adjusted under 35 U.S.C. 154(b) by 363 days.

(21) Appl. No.: 12/553,729

(22) Filed: Sep. 3, 2009

(65) Prior Publication Data

US 2011/0049932 A1 Mar. 3, 2011

(51) Int. Cl.
*B62D 33/06* (2006.01)

(52) U.S. Cl. ........................ 296/190.01; 296/63; 297/232

(58) Field of Classification Search ............. 296/190.01, 296/190.08, 146.15, 201, 63, 64, 14, 232, 296/DIG. 10, 190.1; 52/171.1; 175/219; 180/89.12; 297/232, DIG. 10

See application file for complete search history.

(56) References Cited

U.S. PATENT DOCUMENTS

| | | |
|---|---|---|
| 3,938,761 A | 2/1976 | Hempenstall |
| 4,184,434 A | 1/1980 | Chapin |
| 4,268,214 A | 5/1981 | Zeldman |
| 4,703,568 A | 11/1987 | Theurer et al. |
| 4,732,462 A | 3/1988 | Bel |
| 5,188,419 A | 2/1993 | Liethen |
| 6,095,263 A | 8/2000 | Saunders et al. |
| 6,182,778 B1 | 2/2001 | Henshaw et al. |
| 6,182,797 B1 | 2/2001 | Tebbe et al. |
| 6,189,964 B1 | 2/2001 | Henshaw et al. |
| 6,446,738 B1 | 9/2002 | Boyd |

FOREIGN PATENT DOCUMENTS

| | | |
|---|---|---|
| JP | 59-102657 | 6/1984 |
| JP | 06-049551 | 2/1994 |
| JP | 07-102590 | 4/1995 |
| JP | 07-238572 | 9/1995 |
| JP | 09-158253 | 6/1997 |
| JP | 2005-213935 | 8/2005 |

OTHER PUBLICATIONS

International Search Report and Written Opinion for International Application No. PCT/US2010/047558, mail date May 30, 2011, 8 pages.
Terex Mining, Hydraulic Excavator RH400, Jan. 2003.
Excavator Cab Image 1.
Excavator Cab Image 2.
Excavator Cab Image 3.
Excavator Cab Image 4.
Excavator Cab Image 5.
Excavator Cab Image 6.
Excavator Cab Image 7. Excavator Cab Image 8.
Excavator Cab Image 9.
Excavator Cab Image 10.

*Primary Examiner* — Lori Lyjak
(74) *Attorney, Agent, or Firm* — Foley & Lardner LLP

(57) ABSTRACT

An excavator cab is configured to have an improved field of view for three passengers. Seating is provided for an operator, a trainer, and an trainee. Persons seated in those three seats have substantially similar lines of sight. The excavator cab is arranged such that the operator seat and the trainer seat face a front observation window. The trainee seat is mounted behind the operator seat and is retractable. The points of egress and aisle are wide enough to accommodate a stretcher or a litter in case of an emergency.

20 Claims, 4 Drawing Sheets

EXCAVATOR CAB WITH AN IMPROVED FIELD OF VIEW

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

This invention relates generally to working machine excavators and more particularly to the cab arrangement of an excavator.

The arrangement of an excavator cab is generally constrained by the available space in the forward area of the cab. Generally numerous items are located in this area. These items can include an operator's station, a control console, operator display screens, video monitors, a workstation for service personnel, 2-way or CB radios, and the operator's personal effects. The placement of these items in the forward area must be balanced against many factors, such as providing adequate ingress and egress space for the operator.

When designing an excavator cab, one of the most important features is visibility. This includes visibility of the working part of the machine which includes the bucket, as well as, visibility of the tracks, under carriage, adjacent equipment, personnel, and terrain. Most operator cabs are designed to have one large front window and two side windows to provide visibility of the working part and adjacent equipment, personnel, and terrain. This means that the width of the excavator cab is constrained by the maximum practical width of the front window. Adding a second front window widens the front of the excavator cab, but creates a post that blocks visibility. Placing all machine controls to one side of the operator eliminates visibility on that side.

Issues also arise when training a new operator. Generally, a new operator is trained by being put in control of the working machine while a trainer stands behind the new operator to issue instructions. This puts a relatively untrained operator behind the controls of a very powerful and very expensive piece of equipment. Additionally, the trainer is not always in a position to reach the emergency stop button if necessary.

Depending on the position of the trainer, he or she might not be able to see the working part of the machine, adjacent equipment, nearby personnel, nearby terrain, the operator controls, and the display screens at the same time. Additionally, the trainer will often block the passageways or visibility of the operator. If the working machine encounters rough digging, the trainer will sometimes fall against the new operator.

The idea of locating two operator seats in the front area of the excavator cab has been explored, but it has traditionally been difficult to fit two operator seats, the operator controls, and a passageway within the maximum practical width of the front window.

Therefore, it would be advantageous to have an excavator cab that provides seating for an operator, a trainer, and a trainee which provide a similar line of sight for the operator, trainer, and trainee and can fit two seats, the operator controls, and a passageway within the width of the front window.

SUMMARY OF THE INVENTION

The present invention overcomes the aforementioned drawbacks by providing an excavator cab arrangement with seating for an operator, a trainer, and a trainee. This arrangement creates improved visibility by allowing an operator, a trainer, and a trainee to have substantially the same line of sight. Additionally, this arrangement provides a better environment for training and observation.

In accordance with one aspect of the present invention, an excavator cab with an improved field of view is disclosed. The excavator cab includes a front end having a front observation window facing a working part of the excavator, a first side window in a first side wall extending rearwardly from the front observation window, and a cab floor. The excavator cab also includes an operator seat mounted relative to the cab floor rearward of the front observation window, adjacent to the first side window, positioned to provide a clear line of sight through the front observation window for a person sitting in the operator seat operating the excavator and a trainee seat mounted rearward of the operator seat, adjacent to the first side window, at a height above the operator seat, positioned to provide a clear line of sight for a person seated in the trainee seat through the front observation window and first side window as viewed by the operator.

The excavator cab may also include a second side window in a second side wall extending rearwardly from the front observation window. A trainer seat may be mounted relative to the cab floor rearward of the front observation window, adjacent to the second side window, and positioned to provide a clear line of sight through the front observation window for a person sitting in the trainer seat.

Additionally, the line of sight of a person sitting in the trainee seat intersects with the line of sight of a person sitting in the operator seat, providing a person sitting in the trainee seat with substantially the same visibility of objects through the front observation window as a person sitting in the operator seat.

The excavator cab may also include a cab floor wherein the cab floor is flat. Furthermore, the excavator cab may include at least one display screen wherein the display screen is mounted in a position such that the display screen does not block the line of sight through the front observation window. The excavator cab may also be arranged such that the trainee seat is positioned to provide the same view of the display screens as that of a person seated in the operator seat.

The excavator cab may include a storage space located rearward of the trainer seat adjacent to the second side wall. A person seated in the operator seat, the trainer seat, or the trainee seat may have reachable access to an emergency stop button.

Additionally, the trainee seat may be retractable. The distance from the first side window to the operator seat may be greater than the distance from the first side window to the trainee seat.

Furthermore, the cab floor may include a floor window positioned rearward of the front observation window extending rearwardly from the front observation window toward a rear end of the excavator cab.

The excavator cab may further include a rear end having a rear wall wherein a first point of egress is located in the first side wall positioned rearward of the trainee seat and a second point of egress is located in the rear wall. Additionally, the second point of egress may provide emergency access for a stretcher or a litter. The first point of egress may be opposed to the second point of egress at substantially 90 degrees.

The excavator cab may further include at least one operator control wherein the trainee seat is positioned to provide a view for a person sitting in the trainee seat of the at least one operator control as viewed by the person sitting in the operator seat.

In accordance with a second aspect of the present invention, an excavator cab with an improved field of view is disclosed. The excavator cab includes a front end having a front observation window facing a working part, a first side window in a first side wall extending rearwardly from the front observation window, and a cab floor. The excavator cab further includes an operator seat mounted relative to the cab floor rearward of the front observation window, adjacent to the first side window, positioned to provide a clear line of sight through the front observation window for a person sitting in the operator seat operating the excavator, a rear end having a rear wall wherein a point of egress is located in the rear wall, and a straight path between the operator seat and the point of egress. The point of egress may provide emergency access for a stretcher or a litter.

In accordance with a third aspect of the present invention, an excavator cab with an improved field of view is disclosed. The excavator cab includes a front end having a front observation window facing a working part, a first side window in a first side wall, and a second side window in a second side wall, both extending rearwardly from the front observation window, and a cab floor.

The excavator cab also includes an operator seat mounted relative to the cab floor rearward of the front observation window, adjacent to the first side window and positioned to provide a clear line of sight through the front observation window for a person sitting in the operator seat operating the excavator, a trainer seat mounted relative to the cab floor rearward of the front observation window, adjacent to the second side window, positioned to provide a clear line of sight through the front observation window for a person sitting in the trainer seat, and a trainee seat mounted rearward of the operator seat, adjacent to the first side window at height above the operator seat, positioned to provide a clear line of sight for a person seated in the trainee seat through the front observation window and first side window as viewed by the operator.

Additionally, the excavator cab includes a rear end having a rear wall wherein a second point of egress is located in the rear wall and a straight path between the operator seat and the second point of egress wherein the second point of egress provides emergency access for a stretcher or a litter.

Other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made thereof, to the claims herein for interpreting the scope of the invention.

DETAILED DESCRIPTION OF THE PREFERRED EMBODIMENTS

Figure 1:
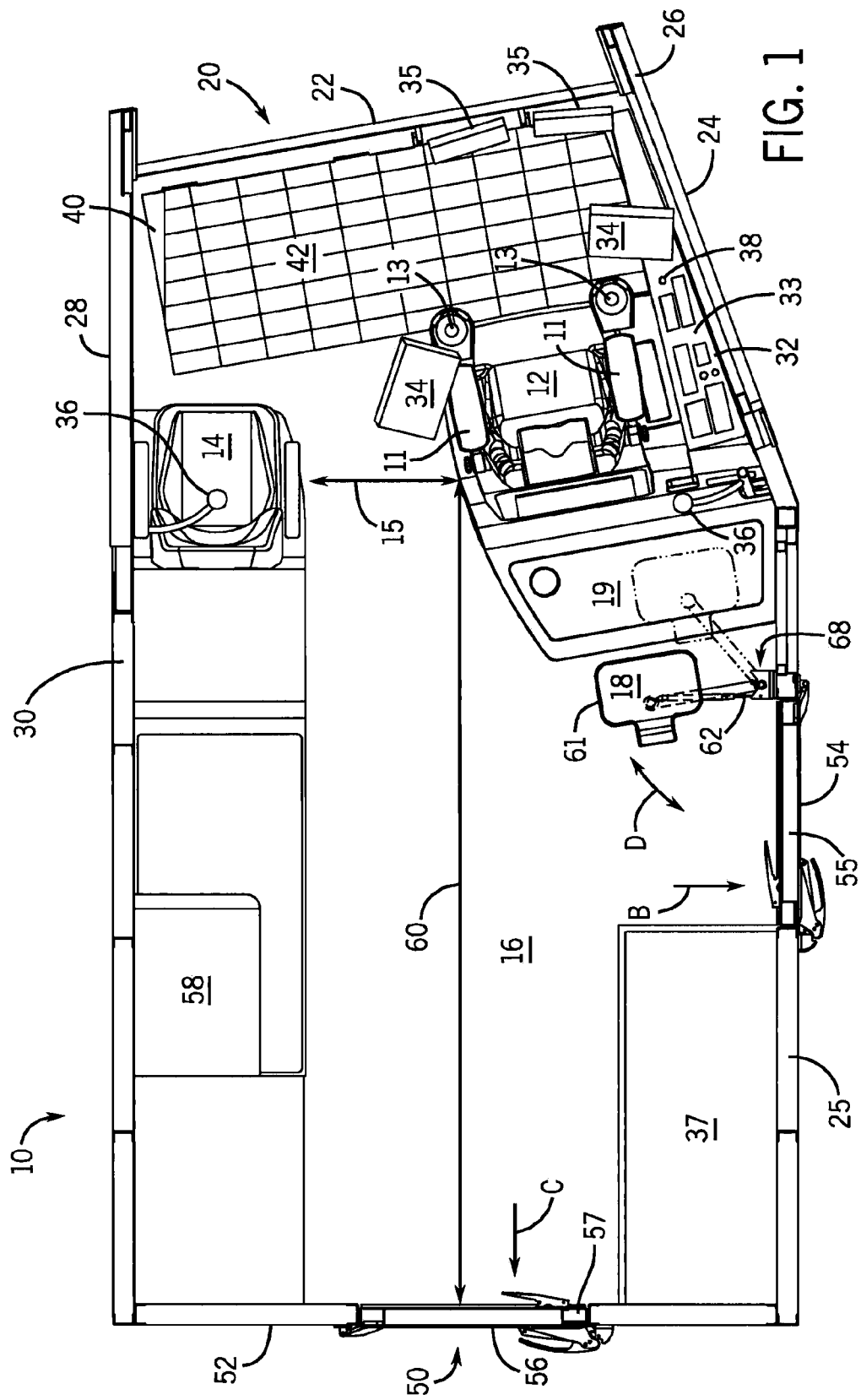
FIG. 1 is a top view of an excavator cab.

Referring to FIG. 1, an excavator cab 10 with an improved field of view incorporating the present invention includes a cab floor 16 that is substantially flat. This eliminates having multiple levels (steps) on a cab floor. The excavator cab 10 also includes a front end 20 having a front observation window 22 facing a working part of the excavator (not shown). A first side window 24 in a first side wall 25 extends rearwardly from the front observation window 22. A second side window 28 in a second side wall 30 spaced from the first side wall 25 extends rearwardly from the front observation window 22.

Preferably, the front observation window 22 is as wide as practical. Currently, the widest commercially available windows having properties necessary to withstand the harsh conditions experienced by an excavator cab front observation window are approximately 72 inches wide. Of course, suitable wider windows may be used when available and smaller windows can be used depending upon the particular application without departing from the scope of the invention.

A front segment 26 of the first side wall 25 is canted toward the second side wall 30. This angle allows the front end 20 of the excavator cab 10 to match the width of the front observation window 22, while maintaining a wider width in the rear end 50 of the excavator cab 10. This arrangement provides good visibility for the operator, while allowing more space in the rear end 50 of the excavator cab 10.

An operator seat 12 is mounted relative to the cab floor 16 rearward of the front observation window 22 interposed between the first side wall 25 and the second side wall 30 and adjacent to the first side window 24. The operator seat 12 is positioned to provide an operator sitting in the operator seat 12 with a clear line of sight through the front observation window 22. This provides visibility through the front observation window 22, the first side window 24, and the second side window 28 for a person operating the excavator.

The operator seat 12 has two armrests 11, one on the left side of the operator seat 12, and one on the right side of the operator seat 12. Each armrest 11 includes a joystick 13 for controlling movement of the excavator cab 10 and the working part. The armrests 11 are adjustable so that individual operators can adjust the armrests 11 for comfort. Operator controls 32 are located on a console 33 positioned between the operator seat 12 and the first side window 24. The console 33 is a large, flat panel designed to accept panel mount controls such as switches, HVAC controls and emergency stop buttons 38. The large flat surface can be easily modified, upgraded, or replaced in the field. One emergency stop button 38 is located on the console 33. It is positioned within an area that is within easy reach of the operator, but in an area that minimizes the potential for accidental actuation.

Display screens 34 are positioned around the operator seat 12 to provide a clear view of the display screen 34 without limiting visibility through the front observation window 22, first side window 24, or second side window 28. One of the display screens 34 is aligned with the junction between the front observation window 22 and first side wall 25 to avoid blocking the operator's view out the front observation window 22 and first side window 24.

A trainer seat 14 is mounted relative to the cab floor 16 rearward of the front observation window 22 and adjacent to the second side window 28. The position of the trainer seat 14 allows the person sitting in the trainer seat 14 and the person sitting in the operator seat 12 to communicate. It also provides a person sitting in the trainer seat 14 with the substantially the same visibility through the front observation window 22, the first side window 24, and the second side window 28 as a person sitting in the operator seat 12. A person sitting in the trainer seat will also have visibility of the display screens 34, video monitors 35, and operator controls 32, although the view will be from a different angle than that of a person sitting in the operator seat 12.

The trainer seat 14 is positioned to provide a clear line of sight for a person sitting in the trainer seat 14 through the front observation window 22. This provides visibility through the front observation window 22, the first side window 24, and the second side window 28 for a person training and/or observing the person operating the excavator. The operator seat 12 and the trainer seat 14 are positioned to allow a passageway 15 between the operator seat 12 and the trainer seat 14. The trainer seat 14 may be illuminated by a light 36.

A trainee workstation 19 is located rearward of the operator seat 12. The workstation may be illuminated with a light 36. A retractable trainee seat 18 is mounted to the trainee workstation 19. The trainee seat is adjacent to the first side wall 25. As will be described with respect to FIG. 4, the trainee seat 18 is elevated so that a person sitting in the trainee seat 18 has substantially the same line of sight as a person sitting in the operator seat 12. This provides optimum visibility through the front observation window 22, the first side window 24, and the second side window 28, as well as a clear view of the operator controls 32 for a person training the person operating the excavator and/or the person being trained. As will be described with respect to FIG. 3, the trainee seat 18 is retractable and can rotate beneath the trainee workstation 19. The trainee workstation 19 includes a trainee footrest 76.

As discussed above, the excavator cab 10 also includes standard operator controls 32 and display screens 34. Video monitors 35 are mounted above the front observation window 22. The video monitors 35 display video feed from external cameras mounted to various parts of the working machine excavator. The video monitors 35 can provide increased visibility to areas that are not normally within view from the operator seat 12, such as the rear of the working machine excavator. The placement of the display screens 34 and video monitors 35 does not limit visibility from the operator seat 12, the trainer seat 14, or the trainee seat 18. Additionally, the placement of the display screens 34 and video monitors 35 is such that a person sitting in the trainer seat 14 or trainee seat 18 has substantially the same view of the display screens 34 and video monitors 35 as a person sitting in the operator seat 12.

The excavator cab 10 can further include a cab roof. The excavator cab 10 also includes shared storage space 37, 58. The shared storage space 37 is located rearward of the trainee seat adjacent to a rear wall 52. The shared storage space 58 is located rearward of the trainer seat 14.

The excavator cab 10 includes two emergency stop buttons 38, 39. Emergency stop button 38 can be reached by a person sitting in the operator seat 12. As will be discussed with regard to FIG. 2, a second emergency stop button 39 is positioned on the side of the trainee workstation 19 closest to the trainer seat 14. This provides reachable access for a person seated in the trainer seat 14 and/or a person seated in the trainee seat 18.

The cab floor 16 may further include a floor window 40 positioned rearward of the front observation window 22 extending rearward from the front observation window 22 toward a rear end 50 of the excavator cab. The floor window 40 may be covered by a floor window grating 42. Using the floor window grating 42 as a footrest allows a person seated in the operator seat 12, operating the excavator, to be as low as possible to the cab floor 16. This provides maximum upward visibility out of the front observation window 22, while the floor window 40 retains downward visibility. In another embodiment, the floor window 40 may extend underneath or behind the operator seat 12 and trainer seat 14.

In yet another embodiment, the cab floor 16 may further include an opening (not shown) covered by a floor window grating 42. The floor window grating 42 may extend underneath or behind the operator seat 12 and trainer seat 14. In an additional embodiment, the floor window grating 42 may extend to the rear wall 52 to provide visibility of the area below the excavator cab 10.

In the present embodiment, the excavator cab 10 may include a rear wall 52 joining the first side wall 25 and the second side wall 30 in the rear end 50 of the excavator cab 10.

A first point of egress 54 is located in the first side wall 25. A second point of egress 56 is located in the rear wall 52 substantially opposed at 90 degrees to the first point of egress. The first point of egress 54 is a side door 55 that opens outward from the excavator cab 10, in the direction of egress B. The second point of egress 56 is a rear door 57 that opens outward from the excavator cab 10, in the direction of egress C.

The width of the aisle 60 from the second point of egress 56 to the front observation window 22 is sufficient to provide access for a stretcher or a litter. The second point of egress 56 thus provides emergency access for a stretcher through the rear door 57. The location of the second point of egress 56 with regards to the operator seat 12, trainer seat 14, and trainee seat 18 allows emergency personnel to bring a stretcher straight in through the rear door 57, up to the operator seat 12, trainer seat 14, or trainee seat 18, as necessitated by the situation. The emergency personnel can lay the stretcher down on the cab floor 16, transfer a person to the stretcher, and bring it straight back out the rear door 57. This configuration does not require any turns or tricky maneuvering. This provides better mobility throughout the excavator cab 10.

Figure 2:
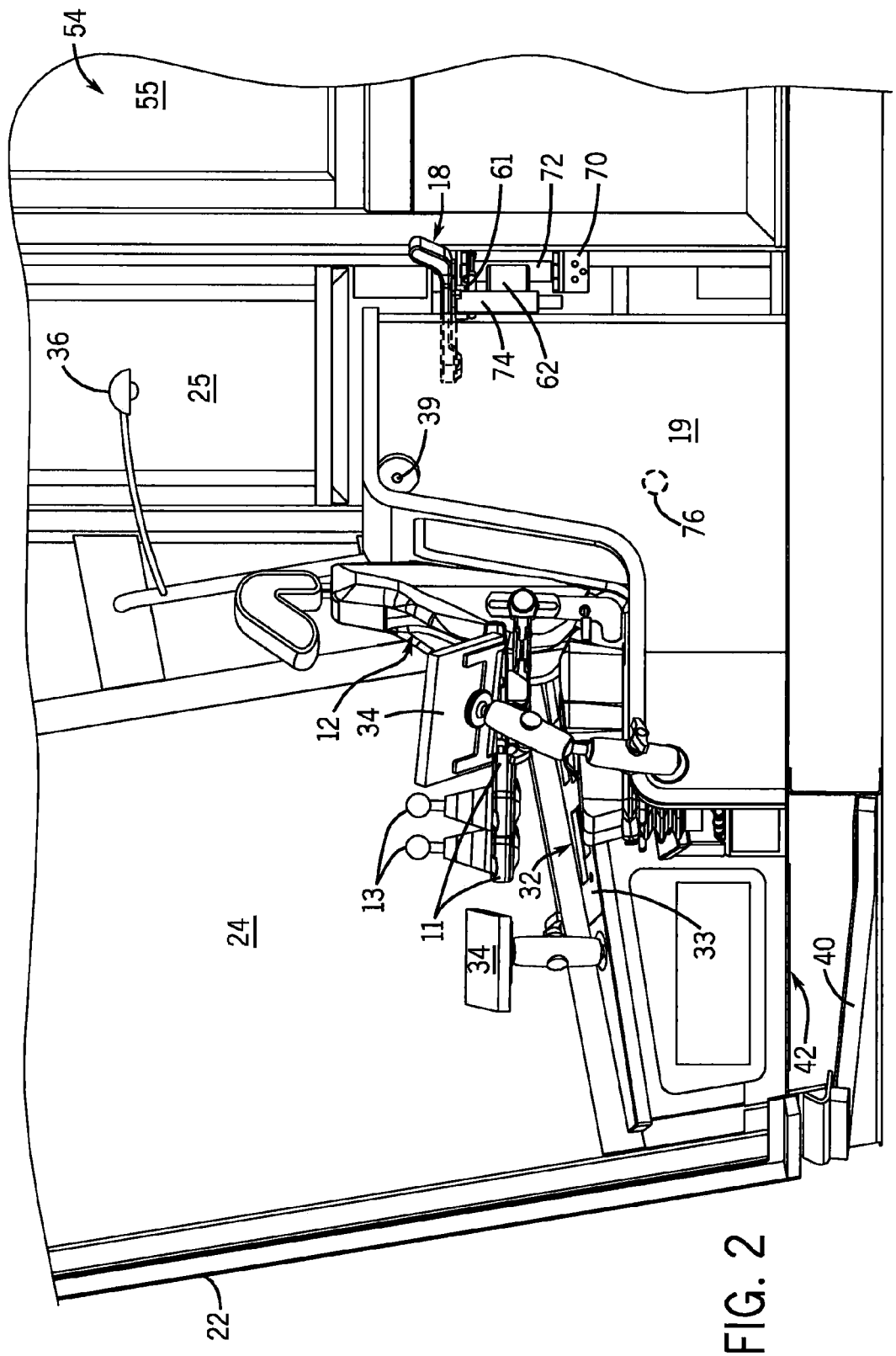
FIG. 2 is a left side perspective view of an operator and a trainee seat.

Referring now to FIG. 2, the operator controls 32 are located between the operator seat 12 and the canted portion of the first side wall 26. This creates a path along aisle 60 from the second point of egress 56 to the operator seat 12 and trainer seat 14 that is wide enough to accommodate a stretcher or litter. The display screens 34 and video monitors 35 are mounted so as not to impede the visibility of a person sitting in the operator seat 12, trainer seat 14, or trainee seat 18.

The trainee seat 18 can swing under the trainee workstation 19 in its retracted position or extend back from the trainee workstation 19 in order to allow a trainee to sit in the trainee seat 18. The retractability of the trainee seat 18 allows a trainee to choose whether to sit or stand behind the operator seat 12. During rough digging, a trainee may prefer to sit in the trainee seat 18 for greater stability. When the trainee chooses to stand, the trainee seat 18 swings beneath the trainee workstation 19. When in its retracted or extended position, the trainee seat 18 does not block the passageway in the rear end 50 of the excavator cab 10 or the first point of egress 54.

An emergency stop button 39 is located on the trainee workstation 19 on the side closest to the trainer seat 14. This provides a person sitting in the trainer seat 14 with reachable access to emergency stop button 39. The trainee or observer sitting in the trainee seat also has reachable access to the emergency stop button 39 located on the trainee workstation 19. This is beneficial because the person sitting in the trainer seat 14 or the trainee seat 18 might be an experienced operator observing a new operator. In that situation, it is helpful for the experienced operator to not only have a clear view of the operator controls and display screens, the working part of the machine, and the adjacent equipment, personnel, and terrain, but also to have reachable access to an emergency stop button.

Figure 3:
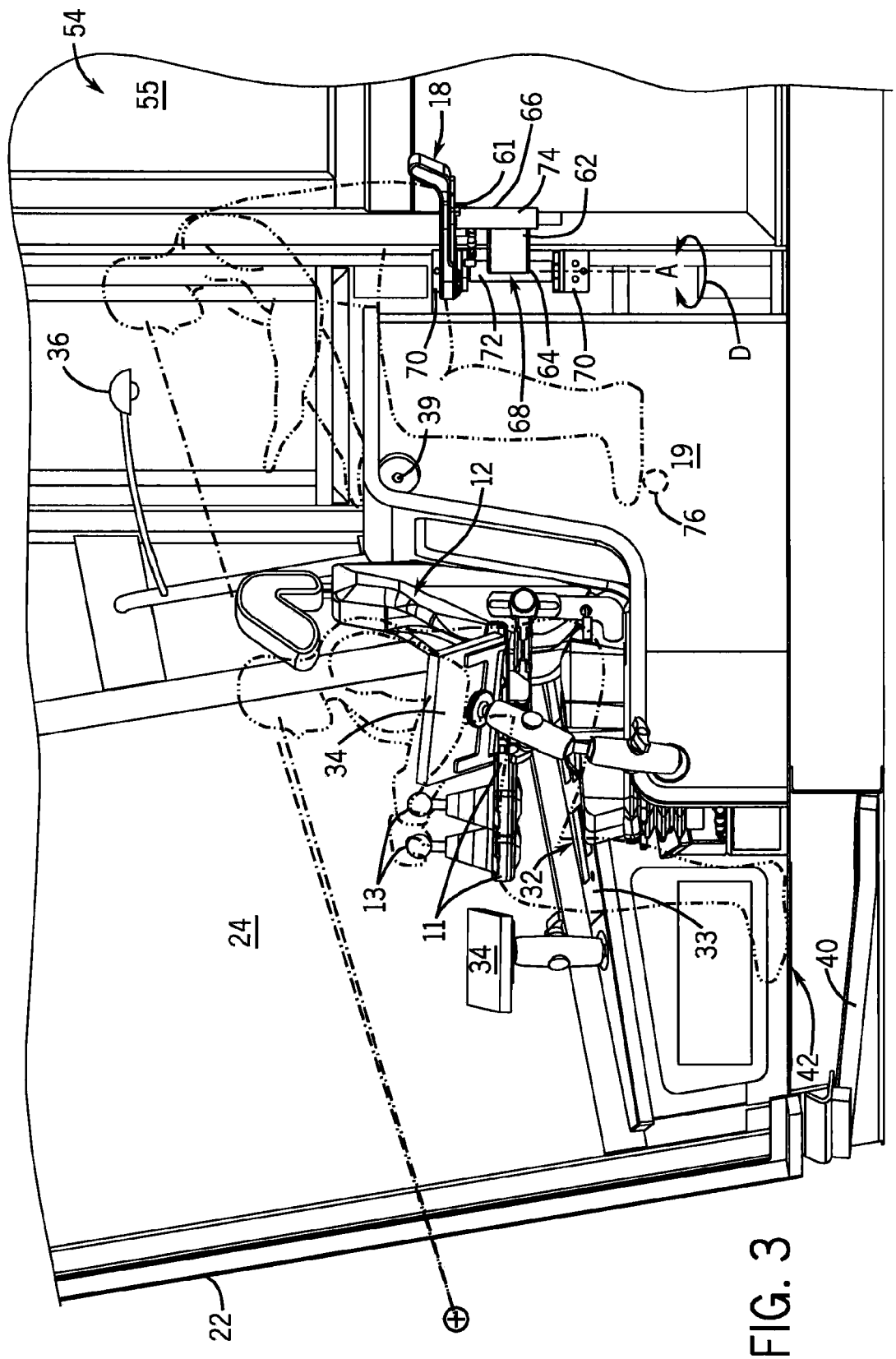
FIG. 3 is a left side perspective view of a trainee seat illustrating the retractability of the trainee seat and the line of sight from both the operator and trainee seats.

Referring now to FIG. 3, the trainee seat 18 is mounted to either the trainee workstation 19, the first side wall 25, or a support in the cab floor 16. In the example embodiment, the trainee seat 18 is mounted to the first side wall 25. The trainee seat 18 comprises a seat base 61 and a cantilevered swing arm 62 pivotably mounted to the first side wall 25. The swing arm 62 has an inner end 64 and an outer end 66. The inner end 64 of the swing arm 62 is pivotably attached to the first side wall 25. The outer end 66 of the swing arm 62 is attached to a support bar 74 that supports the seat base 61.

The swing arm 62 is pivotable between the retracted position, as shown in FIG. 2, and the extended position as shown in FIG. 3 (with a phantom person sitting in trainee seat 18). In the retracted position, the seat base 61 fits substantially underneath the trainee workstation 19. This allows a trainee or an observer to choose to stand behind the trainee workstation 19 rather than sit. In the extended position, the seat base 61 is substantially clear of the trainee workstation 19 so that a trainee or observer can enter, exit, and sit in the trainee seat 18.

The inner end 64 of the swing arm 62 is connected to a pivot joint 68. The pivot joint 68 provides a substantially vertical pivot axis A, about which the swing arm 62 can pivot along line D. In the example embodiment, the pivot joint 68 comprises stationary elements 70 fixed to the first side wall 25 and a pivoting element 72 fixed to the swing arm 62.

The trainee seat 18 is also provided with a means to bias the swing arm 62 to the retracted position. In the example embodiment, the bias means is a spring (not shown) that is positioned to hold the trainee seat 18 in the retracted position substantially under the trainee workstation 19 when the trainee seat 18 is not in use.

Figure 4:
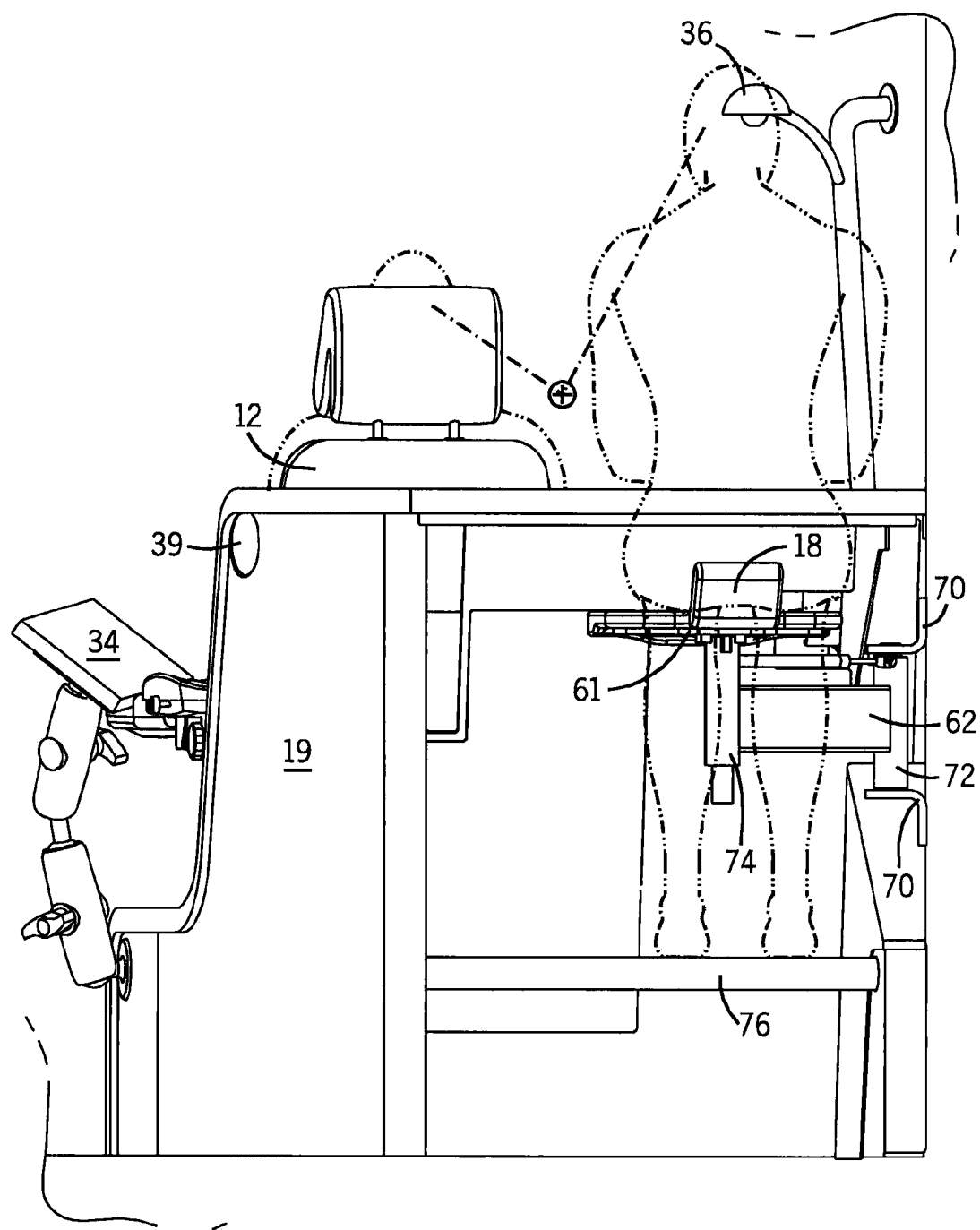
FIG. 4 is a rear elevation view of an operator and a trainee seat illustrating the line of sight from both the operator and trainee seats.

Referring now to FIG. 4, the person sitting in the operator seat 12 and the person sitting in the trainee seat 18 have substantially the same lines of sight. The trainee seat 18 is elevated slightly higher than the operator seat 12. The trainee seat is also positioned closer to the first side wall 25 than the operator seat 12. This allows the person sitting in the trainee seat to look over the right shoulder of the person sitting in the operator seat 12, operating the excavator. The person sitting in the trainee seat 18 can not only see the working part of the excavator from the same angle as the person sitting in the operator seat 12, but can also see the display screens 34, video monitors 35, and operator controls 32 from the same angle. This allows for improved visibility of the observer as well as better training and observation.

Thus the present invention provides an excavator cab that provides seating for an operator, a trainer, and a trainee which provide a similar line of sight for the operator, trainer, and trainee and can fit two seats, the operator controls, and a passageway within the width of the front window. It also provides two points of egress, one of which allows emergency personnel to bring a stretcher into the excavator cab, lay the stretcher down, and take the stretcher back out without having to make any turns.

Although the present invention has been described in detail with reference to certain embodiments, one skilled in the art will appreciate that the present invention can be practiced by other than the described embodiments, which have been presented for purposes of illustration and not of limitation. Therefore, the scope of the invention should not be limited to the description of the embodiments contained herein.

We claim:

1. An excavator cab with an improved field of view comprising:
    a front end having a front observation window facing a working part;
    a first side window in a first side wall extending rearwardly from the front observation window;
    a second side window in a second side wall extending rearwardly from the front observation window;
    a cab floor;
    an operator seat mounted relative to the cab floor rearward of the front observation window, adjacent to the first side window, positioned to provide a clear line of sight through the front observation window for a person sitting in the operator seat operating the excavator;
    a trainer seat mounted relative to the cab floor rearward of the front observation window, adjacent to the second side window, positioned to provide a clear line of sight through the front observation window for a person sitting in the trainer seat; and
    a trainee seat mounted rearward of the operator seat, adjacent to the first side wall, at a height above the operator seat, positioned to provide a clear line of sight for a person seated in the trainee seat through the front observation window and first side window as viewed by the operator.

2. The excavator cab of claim 1 wherein the line of sight of a person sitting in the trainee seat intersects with the line of sight of a person sitting in the operator seat providing a person sitting in the trainee seat with substantially the same visibility of objects through the front observation window and first side window as a person sitting in the operator seat.

3. The excavator cab of claim 1 further comprising a cab floor wherein the cab floor is flat.

4. The excavator cab of claim 1 further comprising at least one display screen wherein the at least one display screen is mounted in a position that does not block the operator's line of sight through the front observation window.

5. The excavator cab of claim 4 wherein the trainee seat is positioned to provide a view for a person sitting in the trainee seat of the at least one display screen, as viewed by a person sitting in the operator seat.

6. The excavator cab of claim 1 wherein a storage space is located rearward of the trainer seat adjacent to the second wall.

7. The excavator cab of claim 1 wherein the trainee seat is retractable.

8. The excavator cab of claim 1 wherein a person has reachable access to an emergency stop when seated in the operator seat, the trainee seat, or the trainer seat.

9. The excavator cab of claim 1 wherein the distance from the first side window to the operator seat is greater than the distance from the first side window to the trainee seat.

10. The excavator cab of claim 1 wherein the cab floor includes a floor window positioned rearward of the front observation window and extending rearwardly from the front observation window toward a rear end of the excavator cab.

11. The excavator cab of claim 1 further comprising a rear end having a rear wall wherein a first point of egress is located in the first side wall positioned rearward of the trainee seat and a second point of egress is located in the rear wall.

12. The excavator cab of claim 11 wherein the first point of egress is opposed to the second point of egress at substantially 90 degrees.

13. The excavator cab of claim 12 wherein the second point of egress provides emergency access for a stretcher or a litter.

14. The excavator cab of claim 1 further comprising at least one operator control wherein the trainee seat is positioned to provide a view for a person sitting in the trainee seat of the at least one operator control as viewed by the person sitting in the operator seat.

15. The excavator cab of claim 11 wherein the second point of egress provides emergency access for a stretcher or a litter.

16. An excavator cab with an improved field of view comprising:
- a front end having a front observation window facing a working part;
- a first side window in a first side wall extending rearwardly from the front observation window;
- a second side window in a second side wall extending rearwardly from the front observation window;
- a cab floor;
- an operator seat mounted relative to the cab floor rearward of the front observation window, adjacent to the first side window, positioned to provide a clear line of sight through the front observation window for a person sitting in the operator seat operating the excavator;
- a trainer seat mounted relative to the cab floor rearward of the front observation window, adjacent to the second side window, positioned to provide a clear line of sight through the front observation window for a person sitting in the trainer seat;
- a trainee seat mounted rearward of the operator seat, adjacent to the first side window, at a height above the operator seat, positioned to provide a clear line of sight for a person seated in the trainee seat through the front observation window and first side window as viewed by the operator;
- a rear end having a rear wall wherein a point of egress is located in the rear wall; and
- a straight path between the operator seat and the point of egress wherein the point of egress provides emergency access for a stretcher or a litter.

17. The excavator cab of claim 16 wherein the line of sight of a person sitting in the trainee seat intersects with the line of sight of a person sitting in the operator seat providing a person sitting in the trainee seat with substantially the same visibility of objects through the front observation window and first side window as a person sitting in the operator seat.

18. The excavator cab of claim 16 wherein the cab floor is flat.

19. The excavator cab of claim 16 wherein the trainee seat is retractable.

20. The excavator cab of claim 16 wherein a person has reachable access to an emergency stop when seated in the operator seat, the trainee seat, or the trainer seat.

* * * * *